(12) United States Patent
Mori

(10) Patent No.: US 11,307,702 B2
(45) Date of Patent: Apr. 19, 2022

(54) OPERATION DETECTION DEVICE AND DISPLAY DEVICE

(71) Applicant: Murata Manufacturing Co., Ltd., Nagaokakyo (JP)

(72) Inventor: Kenichi Mori, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 130 days.

(21) Appl. No.: 16/592,980

(22) Filed: Oct. 4, 2019

(65) Prior Publication Data

US 2020/0034021 A1 Jan. 30, 2020

Related U.S. Application Data

(63) Continuation of application No. PCT/JP2018/035251, filed on Sep. 25, 2018.

(30) Foreign Application Priority Data

Oct. 3, 2017 (JP) .............................. JP2017-193195

(51) Int. Cl.
*G06F 3/041* (2006.01)
*G06F 3/044* (2006.01)

(52) U.S. Cl.
CPC .......... *G06F 3/0416* (2013.01); *G06F 3/0412* (2013.01); *G06F 3/0445* (2019.05);
(Continued)

(58) Field of Classification Search
CPC ...... G06F 3/041; G06F 3/0412; G06F 3/0414; G06F 3/04142; G06F 3/04144;
(Continued)

(56) References Cited

U.S. PATENT DOCUMENTS 8,810,524 B1 * 8/2014 Rosenberg ............ G06F 1/1692
345/173
9,065,557 B2 6/2015 Kodama
(Continued)

FOREIGN PATENT DOCUMENTS

JP 2012230519 A 11/2012
JP 2017509983 A 4/2017
(Continued)

OTHER PUBLICATIONS

International Search Report issued in PCT/JP2018/035251, dated Nov. 13, 2018.
(Continued)

*Primary Examiner* — Jason M Mandeville
(74) *Attorney, Agent, or Firm* — ArentFox Schiff LLP

(57) ABSTRACT

An operation detection device that includes a panel that receives a touch operation from a first main surface or a second main surface; a pressing operation detection unit that detects a pressing operation on the first main surface or the second main surface of the panel; an electrostatic capacitance sensor that detects the touch operation on the first main surface or the second main surface of the panel; and a control unit that determines, according to a detection result of the pressing operation detection unit, which of the first main surface and the second main surface the pressing operation is performed and switches a driving mode of the electrostatic capacitance sensor.

21 Claims, 5 Drawing Sheets

(52) U.S. Cl.
CPC ........ *G06F 3/0446* (2019.05); *G06F 3/04166* (2019.05); *G06F 3/0443* (2019.05); *G06F 2203/04105* (2013.01)

(58) Field of Classification Search
CPC ............... G06F 3/0416; G06F 3/04166; G06F 3/041662; G06F 3/044; G06F 3/0443; G06F 3/0445; G06F 3/0446; G06F 2203/04105
USPC .................................................. 345/173, 174
See application file for complete search history.

(56) References Cited

U.S. PATENT DOCUMENTS

| | | | |
|---|---|---|---|
| 9,191,473 | B2 | 11/2015 | Shimada |
| 10,146,344 | B2* | 12/2018 | Chang ................. G06F 3/04186 |
| 10,303,313 | B2 | 5/2019 | Kurasawa et al. |
| 10,817,116 | B2* | 10/2020 | Bagheri ................. G06F 3/044 |
| 10,866,681 | B2* | 12/2020 | Oh ........................... G06F 3/044 |
| 2013/0229382 | A1* | 9/2013 | Huang ................. G06F 3/0446 345/174 |
| 2014/0045553 | A1 | 2/2014 | Shimada |
| 2014/0218309 | A1 | 8/2014 | Park |
| 2014/0347304 | A1* | 11/2014 | Ando ..................... G01B 7/003 345/173 |
| 2015/0023446 | A1 | 1/2015 | Kodama |
| 2016/0034091 | A1 | 2/2016 | Cheng et al. |
| 2016/0117003 | A1 | 4/2016 | Chang et al. |
| 2017/0269785 | A1* | 9/2017 | Abdollahian ....... G06F 3/04883 |
| 2017/0277300 | A1 | 9/2017 | Kurasawa et al. |
| 2017/0277340 | A1 | 9/2017 | Yu |
| 2019/0278403 | A1 | 9/2019 | Kurasawa et al. |

FOREIGN PATENT DOCUMENTS

| | | |
|---|---|---|
| JP | 2017174013 A | 9/2017 |
| WO | 2015192604 A1 | 12/2015 |

OTHER PUBLICATIONS

Written Opinion of the International Searching Authority issued in PCT/JP2018/035251, dated Nov. 13, 2018.

* cited by examiner

PRESSING SENSOR OUTPUT

PRESSING SENSOR OUTPUT

ELECTROSTATIC CAPACITANCE

ELECTROSTATIC CAPACITANCE

OPERATION DETECTION DEVICE AND DISPLAY DEVICE

CROSS REFERENCE TO RELATED APPLICATIONS

The present application is a continuation of PCT/JP2018/035251 filed Sep. 25, 2018, which claims priority to Japanese Patent Application No. 2017-193195, filed Oct. 3, 2017, the entire contents of each of which are incorporated herein by reference.

TECHNICAL FIELD

The present invention relates to an operation detection device and a display device that detect a user operation on an operation target.

BACKGROUND

Currently, a portable terminal is provided with a transparent display as disclosed in Patent Document 1 (identified below). The portable terminal of Patent Document 1 includes a transparent display, a first touch panel that detects a touch operation, and a second touch panel provided on a back side of a side on which the first touch panel is provided.

Patent Document 1: Japanese Patent Application Laid-Open No. 2012-230519 A.

However, in the portable terminal of Patent Document 1, the touch panels for detecting the touch operation are provided on both front and back surfaces. That is, the portable terminal of Patent Document 1 has touch sensors such as electrostatic capacitance sensors on both the front and back surfaces. If the touch sensors are provided on both the front and back surfaces as in Patent Document 1, a problem occurs in that a thickness of the device increases, or a manufacturing process becomes complicated.

SUMMARY OF THE INVENTION

Accordingly, the exemplary embodiments of the present invention provides an operation detection device and a display device that detect touch operations on both front and back surfaces without having touch sensors provided on both the front and back surfaces.

Thus, in an exemplary aspect, an operation detection device includes a panel that receives a touch operation from a first main surface or a second main surface, a pressing operation detection unit that detects a pressing operation on the first main surface or the second main surface of the panel, an electrostatic capacitance sensor that detects the touch operation on the first main surface or the second main surface of the panel, and a control unit that determines, according to a detection result of the pressing operation detection unit, which of the first main surface and the second main surface the pressing operation is performed and switches a driving mode of the electrostatic capacitance sensor.

According to the exemplary aspect, the electrostatic capacitance sensor is configured to detect the touch operation on the first main surface or the second main surface of the panel, however, a distance between a position where the electrostatic capacitance sensor is arranged and a panel surface is different in the first main surface and in the second main surface. Therefore, sensitivities of the touch operation on the first main surface and the second main surface in the electrostatic capacitance sensor are different. However, in the operation detection device according to the present invention, the pressing operation detection unit determines which of the first main surface and the second main surface the pressing operation is performed and switches the driving mode of the electrostatic capacitance sensor, to thereby enable the sensitivity to be uniform. Accordingly, the touch operations on both the front and back surfaces can be detected with the same degree of sensitivity without providing the touch sensors on both the front and back surfaces.

For purposes of this disclosure, it is noted that the switching of the driving mode of the electrostatic capacitance sensor refers to, for example, switching of a detection threshold value of the electrostatic capacitance sensor. In addition, when the electrostatic capacitance sensor is a mutual capacitance type sensor, in order to switch the driving mode, driving of a transmission electrode and a reception electrode of the electrostatic capacitance sensor can be switched.

According to the exemplary embodiments of the present invention, the touch operations on both the front and back surfaces can be detected without having the touch sensors provided on both the front and back surfaces.

DETAILED DESCRIPTION

Figure 1:
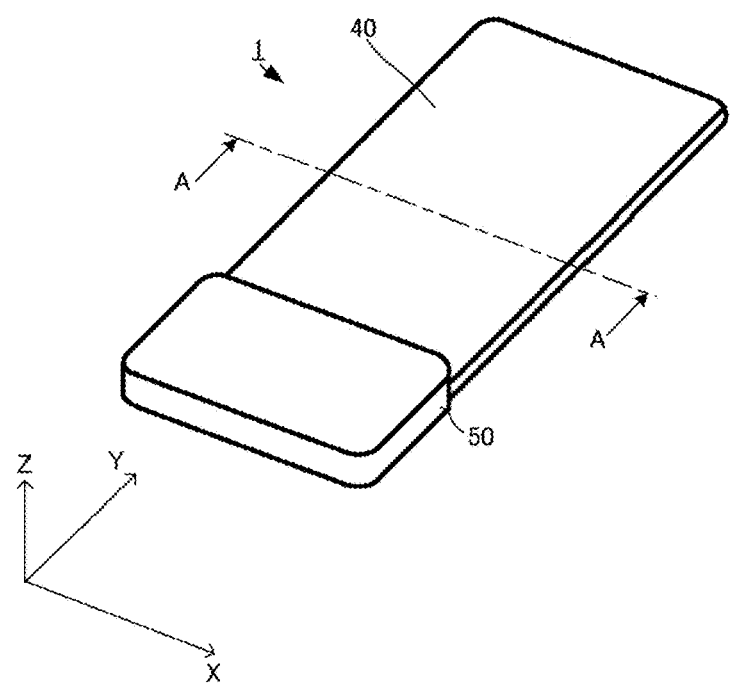
FIG. 1 is an external perspective view of a display device.
Figure 2:
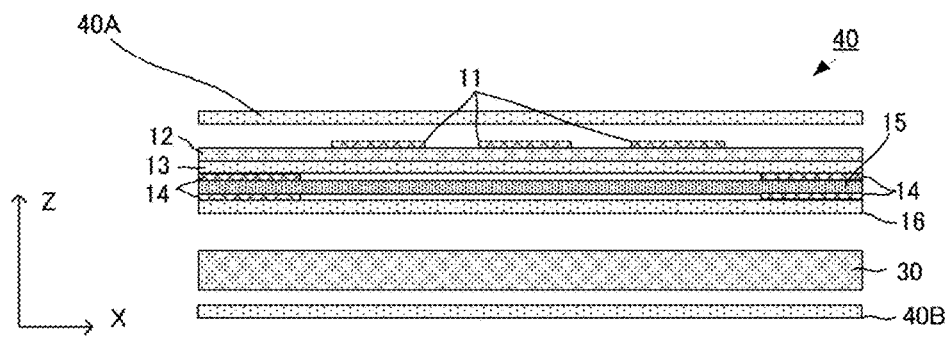
FIG. 2 is a side sectional view of a display panel.
Figure 3:
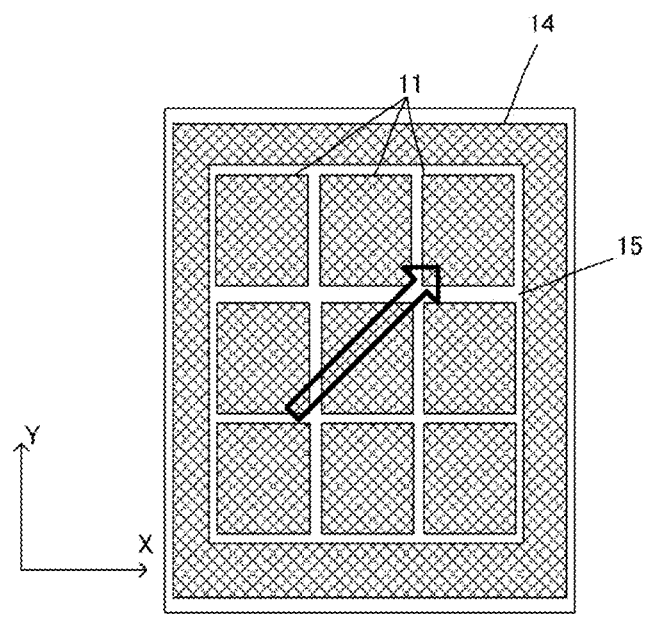
FIG. 3 is a plan view of the display panel.

Hereinafter, a display device provided with an operation detection device of the present invention is described with reference to the drawings. FIG. 1 is an external perspective view of a display device 1. FIG. 2 is a cross-sectional exploded view of a display panel 40. FIG. 3 is a plan view showing a partial configuration when the display panel 40 is planarly viewed.

According to the exemplary embodiment, the display device 1 includes a case 50 and a display panel 40 in appearance, as shown in the external perspective view of FIG. 1. The case 50 has a rectangular parallelepiped shape formed thin in a thickness direction (i.e., in the Z direction). The case 50 is long in a width direction (i.e., in the X direction) and short in a length direction (i.e., in the Y direction).

Moreover, the display panel 40 is connected to a side surface of the case 50 so as not to overlap with a display surface. The display panel 40 has a rectangular flat plate shape in plan view. The display panel 40 is provided with a display. The display panel 40 also functions as an operation surface (e.g., an operation target) on which a user performs a touch operation using a finger, a pen, or the like. It is noted that although the rectangular flat plate shape is shown here, other shapes, such as a polygon or a circle, may be adopted.

As shown in FIG. 2, the display panel 40 includes a first front panel 40A, electrostatic capacitance electrodes 11, an electrostatic capacitance sensor insulating layer 12, a first pressing electrode film 13, pressing electrodes 14, a piezoelectric film 15, a second pressing electrode film 16, a display unit 30, and a second front panel 40B. The electrostatic capacitance electrodes 11, the pressing electrodes 14, and the display unit 30 are connected to an unillustrated circuit board built in the case 50.

The piezoelectric film 15 is arranged on substantially the entire surface of the display panel 40 in plan view. The pressing electrode 14 is arranged in a frame shape at the outer peripheral portion of the piezoelectric film 15 in plan view. The pressing electrode 14 is not necessarily be annular as shown in FIG. 3 and may partially have an electrode non-formed part. Also, the widths of the electrodes are not necessarily be the same, and are adjusted as necessary according to refinements of the exemplary embodiment. The electrostatic capacitance electrodes 11 are arranged in a region surrounded by the pressing electrodes 14 in plan view. As shown, the pressing electrodes 14 and the electrostatic capacitance electrodes 11 do not overlap with each other.

When the user presses the display panel 40, the piezoelectric film 15 is bent in a normal direction to generate an electric charge. The piezoelectric film 15 uses, for example, highly transparent chiral polymer. The chiral polymer is preferably uniaxially stretched polylactic acid (PLA). As the polylactic acid, L-type polylactic acid (PLLA) or D-type polylactic acid (PDLA) is mentioned. In the chiral polymer, a main chain has a helical structure, and when the main chain is uniaxially stretched and molecules are aligned, the polymer generates piezoelectricity. An amount of charge generated by the uniaxially stretched chiral polymer is uniquely determined by an amount of displacement that the display panel 40 is displaced in the normal direction.

A piezoelectric constant of the uniaxially stretched PLLA belongs to a very high class in polymers. That is, a pressing operation of the user can be detected with high sensitivity, and a signal corresponding to an amount of pressing can be output with high accuracy.

Further, because the chiral polymer generates piezoelectricity by orientation processing of molecules by stretching or the like, poling treatment is not necessary as in other polymers such as polyvinylidene difluoride (PVDF) and piezoelectric ceramics. Therefore, the piezoelectric constant of PLLA does not fluctuate with time and is extremely stable. Furthermore, because the polylactic acid is not pyroelectric, the amount of charge to be detected does not change even when heat from the user's finger or the like is transmitted.

In the present embodiment, as shown by an arrow in FIG. 3, the piezoelectric film 15 is arranged such that a uniaxial stretching direction forms an angle of about 45° to the X direction and the Y direction. By having the above arrangement, the pressing operation can be detected with higher sensitivity. It is noted that approximately 45° may be 45°±10°, and may be, for example, 22.5° to 67.5°.

The pressing operation detection unit is not limited to the piezoelectric sensor using the piezoelectric film as shown in the present embodiment, and may be the one that outputs different values in cases when the pressing operation is made from a side of the first front panel 40A corresponding to the first main surface and when the pressing operation is made from a side of the second front panel 40B corresponding to the second main surface. In an exemplary embodiment, the sensor preferably outputs the values of opposite polarities. However, as long as the sensor is the piezoelectric sensor, slight deformation to the display panel 40 can be detected. It is also noted that the piezoelectric film 15 is not limited to the mode using PLLA, and a material with low transparency such as PVDF can also be used. When the material with low transparency is used, the piezoelectric film 15 may be arranged on the side of the second front panel 40B with respect to the display unit 30.

Figure 4:
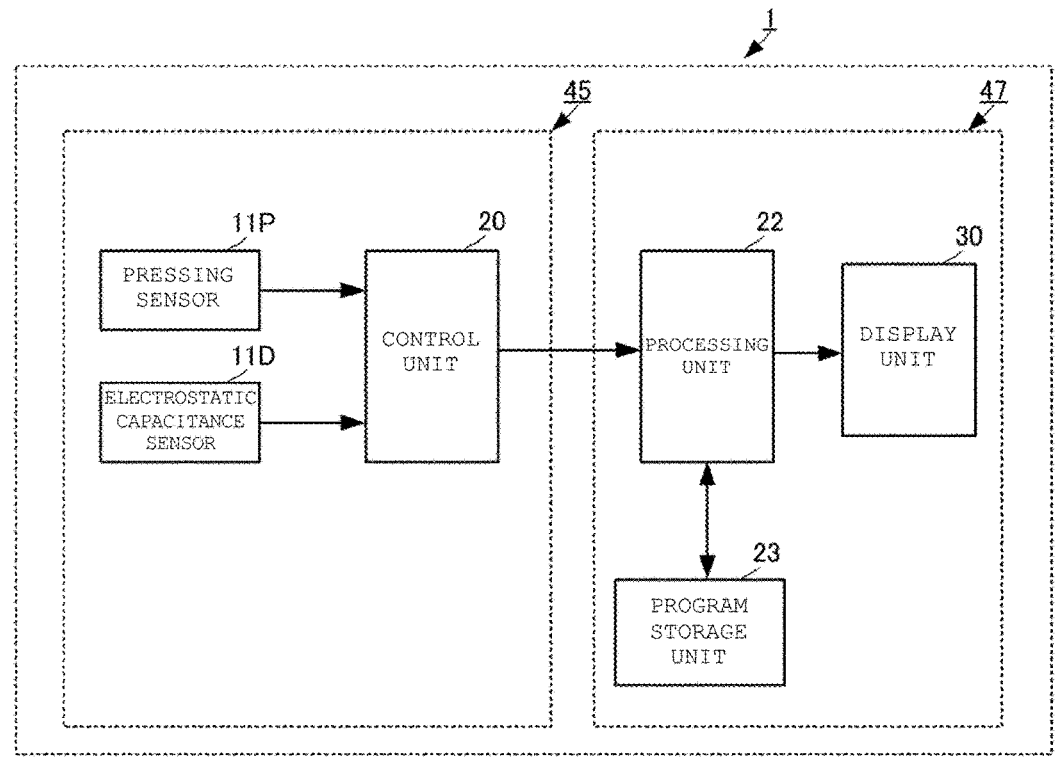
FIG. 4 is a block diagram of the display device.

FIG. 4 is a block diagram showing a configuration of the display device 1. The display device 1 functionally includes an operation detection device 45 and a processing device 47, as shown in FIG. 4. A pressing sensor 11P and an electrostatic capacitance sensor 11D are connected with a control unit 20. The pressing sensor 11P is formed of the first pressing electrode film 13, the pressing electrodes 14, the piezoelectric film 15, and the second pressing electrode film 16. The electrostatic capacitance sensor 11D is a self-capacitance type sensor, and includes the electrostatic capacitance electrodes 11 and the electrostatic capacitance sensor insulating layer 12. The pressing sensor 11P, the electrostatic capacitance sensor 11D, and the control unit 20 form the operation detection device 45. A processing unit 22, a program storage unit 23, and the display unit 30 form the processing device 47. The processing device 47 is microprocessor or the like configured to execute software to perform the algorithms described herein according to an exemplary aspect.

When the user performs the touch operation on the first front panel 40A or the second front panel 40B in the display panel 40, the piezoelectric film 15 is bent in the normal direction to generate an electric charge. The pressing electrodes 14 output the electric charge as a voltage. At the same time, a capacitance between the user's finger and the electrostatic capacitance electrodes 11 changes. The control unit 20 detects a touch position by detecting a change in capacitance output from the electrostatic capacitance sensor 11D. The control unit 20 outputs information (e.g., a position detection signal) indicating the detected touch position to the processing unit 22.

The processing unit 22 includes a central processing unit (CPU) and controls the processing device 47 in an integrated manner. That is, the processing unit 22 reads an operation program stored in the program storage unit 23 and performs various processing to execute the disclosed algorithms. For example, the processing unit 22 controls the display unit 30 to display an image, determines an operation input content according to the position detection signal input from the control unit 20, and changes the displayed image. The display unit 30 may have transparency. In this case, polylactic acid having high transparency is used as the piezoelectric film 15.

Figure 5A:
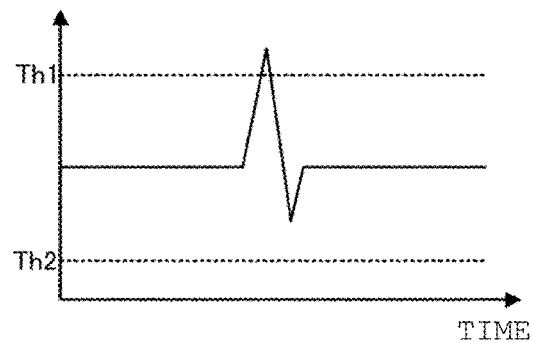
FIGS. 5(A) and 5(B) are views showing signals of voltage values on a time axis.
Figure 5B:
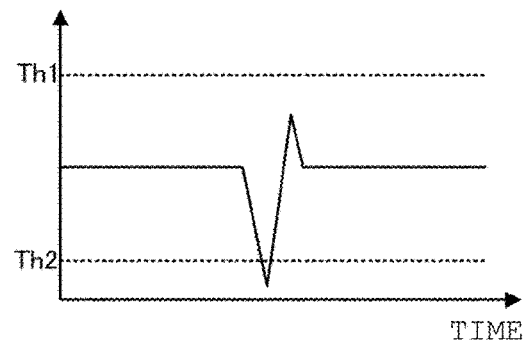
Figure 6A:
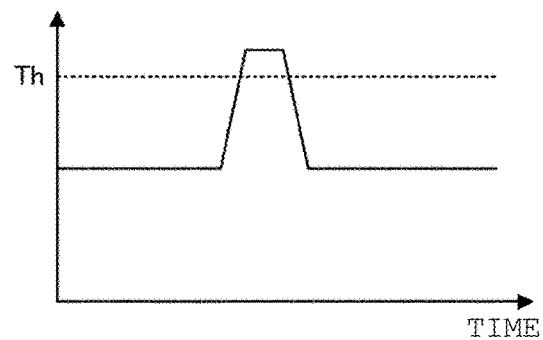
FIGS. 6(A) and 6(B) are views showing signals of capacitance values on the time axis.
Figure 6B:
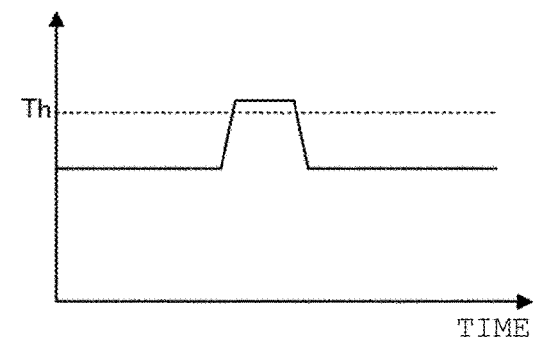

FIGS. 5(A) and 5(B) are views showing signals of voltage values of the pressing sensor 11P on a time axis. FIGS. 6(A) and 6(B) are views showing signals of the capacitance of the electrostatic capacitance sensor 11D on the time axis.

FIG. 5(A) shows an output when the first front panel 40A is pressed, and FIG. 5(B) shows an output when the second front panel 40B is pressed. The control unit 20 sets a first threshold value Th1 on a plus side and a second threshold Th2 on a minus side with respect to a reference potential. The control unit 20 is configured to determine that the first front panel 40A is pressed when a voltage value exceeds the first threshold value Th1, and to determine that the second front panel 40B is pressed when the voltage value falls below the second threshold value Th2. It is noted that the first threshold value Th1 and the second threshold value Th2 may be the same value (Th1=Th2) with respect to the reference potential, or may be set to different values. Specifically, when the pressing sensor 11P is arranged closer to the side of the first front panel 40A than the second front panel 40B as shown in FIG. 2, the value of Th1 may be set larger than the value of Th2. By setting the threshold value in the above manner, an operator can operate with the same sensitivity. The above setting is made because, when the positional relationship is the one as shown in FIG. 2, the deformation of the second front panel 40B is more difficult to be transmitted than the deformation on the side of the first front panel 40A. The threshold value may be set in consideration of a difference in elastic modulus between the side of the first front panel 40A and the side of the second front panel 40B with respect to the pressing sensor 11P.

FIG. 6(A) shows an output when the first front panel 40A is touched, and FIG. 6(B) shows an output when the second front panel 40B is touched. When an electrostatic capacitance value exceeds a threshold value Th, the control unit 20 determines that the touch operation is performed.

As shown in FIGS. 6(A) and 6(B), when the second front panel 40B is touched, the electrostatic capacitance value becomes smaller than when the first front panel 40A is touched. As shown in FIG. 2, a distance between the second front panel 40B and the electrostatic capacitance sensor 11D is longer than a distance between the first front panel 40A and the electrostatic capacitance sensor 11D.

Therefore, when the pressing sensor 11P determines that the second front panel 40B is pressed, the control unit 20 reduces the threshold value Th as shown in FIG. 6(B). With this configuration, the control unit 20 can set the sensitivity uniform both when the first front panel 40A is touched and when the second front panel 40B is touched. Therefore, the control unit 20 can detect the touch operation on both front and back surfaces with the same degree of sensitivity without having the touch sensors provided on both the front and back surfaces (e.g., Th1 and Th2 may have the same value but may preferably be different).

The pressing sensor 11P of the exemplary embodiment not only provides a function of changing the threshold value of the electrostatic capacitance sensor 11D to set the sensitivity of the touch operation on both the front and back surfaces to the same degree, but also detects strength of pressing down the display panel 40 and then outputs information indicating an amount of pressing down to the control unit 20. The amount of pressing down can be determined by integrating the signal of the pressing sensor 11P shown in FIG. 5. In other words, the pressing sensor 11P of the present invention can provide a display device that is configured to detect a touch position and an amount of pressing down at the touch position.

When the display panel 40 has flexibility, the pressing sensor 11P is configured to detect a bending direction and an amount of bending of the display panel 40, and to output information indicating a bending state to the control unit 20. The bending direction can be determined by the polarity of the signal of the pressing sensor 11P shown in FIG. 5. The amount of bending can be determined by integrating the signal of the pressing sensor 11P shown in FIG. 5. In other words, the pressing sensor 11P of the present invention can provide a display device that can detect the touch position and the bending state of the display panel 40.

Figure 7:
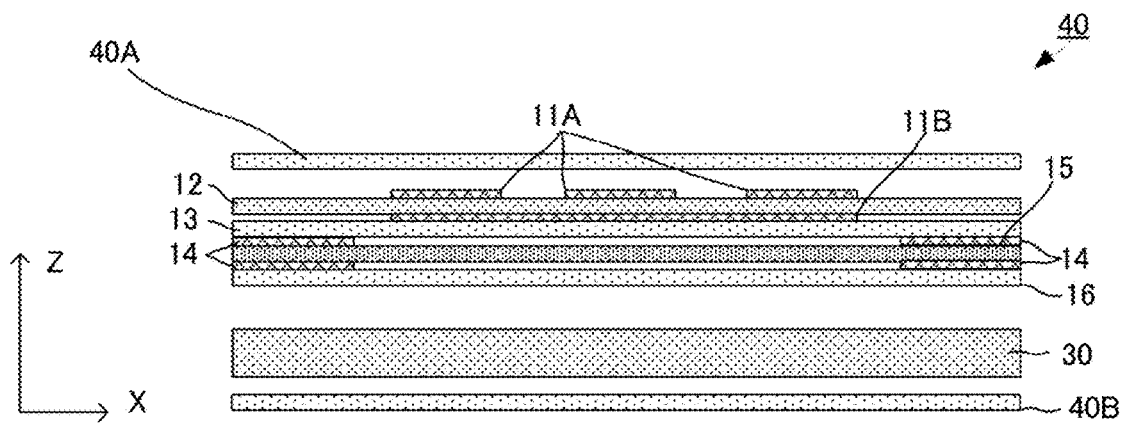
FIG. 7 is a side sectional view of the display panel.
Figure 8:
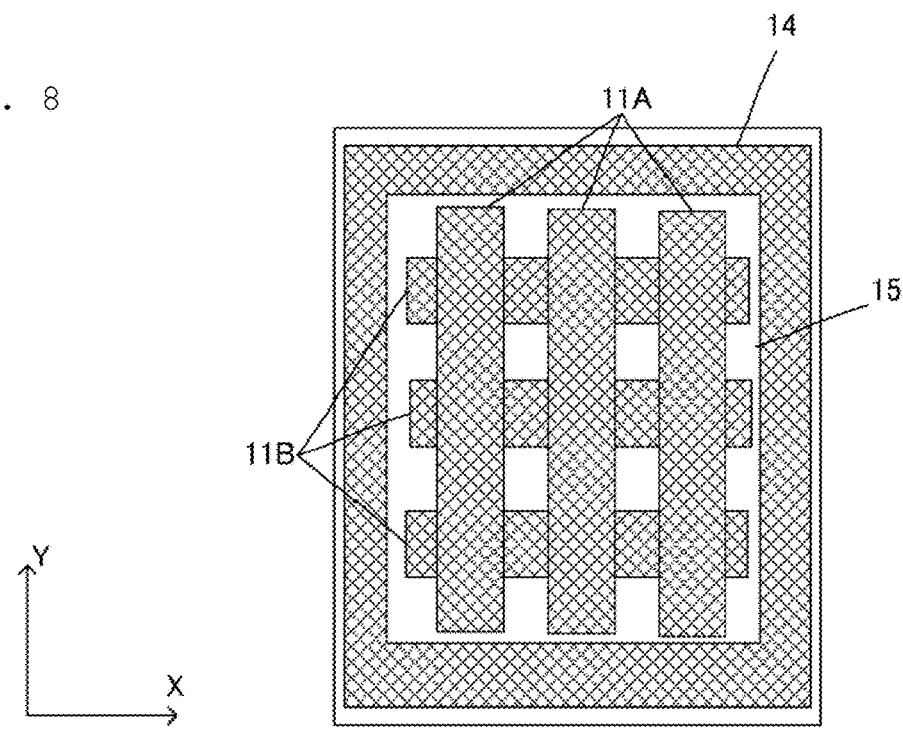
FIG. 8 is a plan view of the display panel.

Next, FIG. 7 is a cross-sectional exploded view of the display panel 40 according to a first refinement of the exemplary embodiment. FIG. 8 is a plan view showing a partial configuration of the display panel 40.

In the display panel shown in FIGS. 7 and 8, an electrostatic capacitance sensor is a mutual capacitance type sensor. The other configuration is the same as the configuration shown in FIGS. 2 and 3, and the description is omitted for clarity purposes.

The mutual capacitance type electrostatic capacitance sensor includes first electrostatic capacitance electrodes 11A and second electrostatic capacitance electrodes 11B arranged in a lattice shape so as to oppose to each other while interposing the electrostatic capacitance sensor insulating layer 12.

The mutual capacitance type electrostatic capacitance sensor inputs a pulse signal to a transmission electrode (Tx) and measures a current at a reception electrode (Rx) to detect a change in electrostatic capacitance. With this configuration, the control unit 20 determines the presence of touching by the user.

Figure 9A:
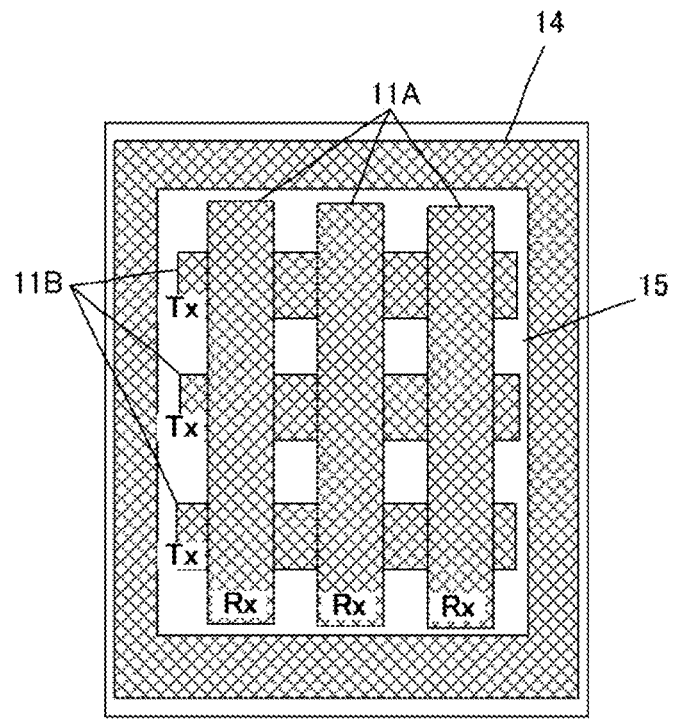
FIG. 9(A) is a plan view showing an operation of each electrode when a first front panel 40A is touched.

As shown in FIG. 9(A), when the pressing sensor 11P determines that the first front panel 40A is pressed, the control unit 20 uses the first electrostatic capacitance electrodes 11A arranged on the side of the first front panel 40A as the receiving electrodes (Rx), and uses the second electrostatic capacitance electrodes 11B arranged on the side of the second front panel 40B as the transmitting electrodes (Tx).

Figure 9B:
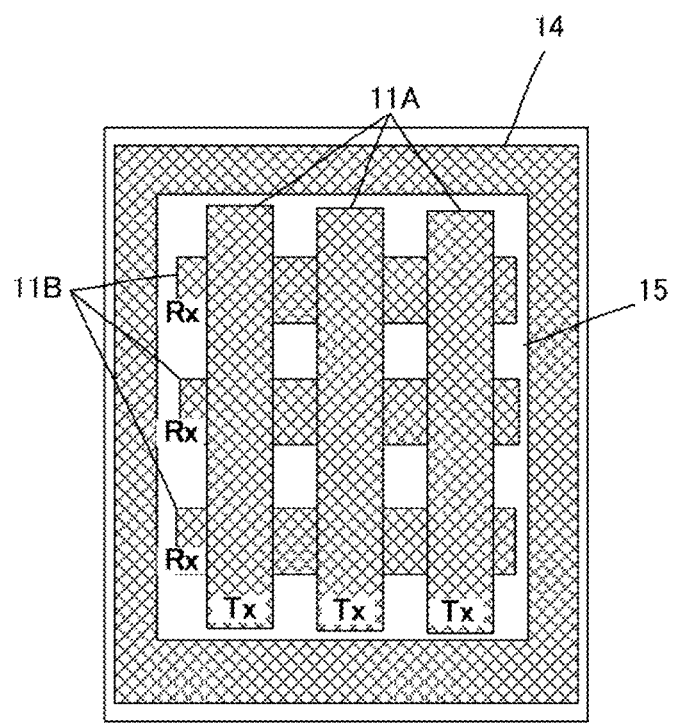
FIG. 9(B) is a plan view of the display panel showing an operation of each electrode when a second front panel 40B is touched.

Further, as shown in FIG. 9(B), when the pressing sensor 11P determines that the second front panel 40B is pressed, the control unit 20 uses the second electrostatic capacitance electrodes 11B arranged on the side of the second front panel 40B as the receiving electrodes (Rx), and uses the first electrostatic capacitance electrodes 11A arranged on the side of the first front panel 40A as the transmitting electrodes (Tx).

With this configuration, the control unit 20 can set the sensitivity uniform both when the first front panel 40A is touched and when the second front panel 40B is touched. Accordingly, the control unit 20 can detect the touch operation on both the front and back surfaces with the same degree of sensitivity without having the touch sensors provided on both the front and back surfaces.

Figure 10:
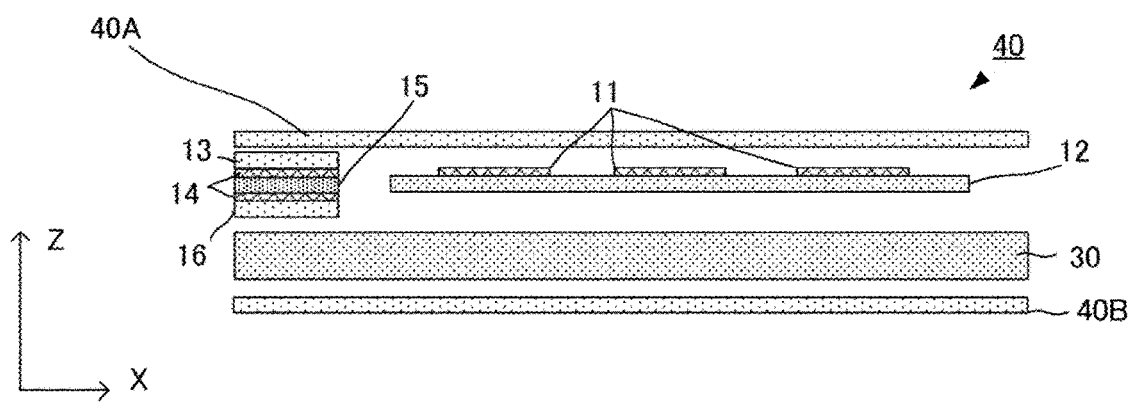
FIG. 10 is a side sectional view of the display panel.
Figure 11:
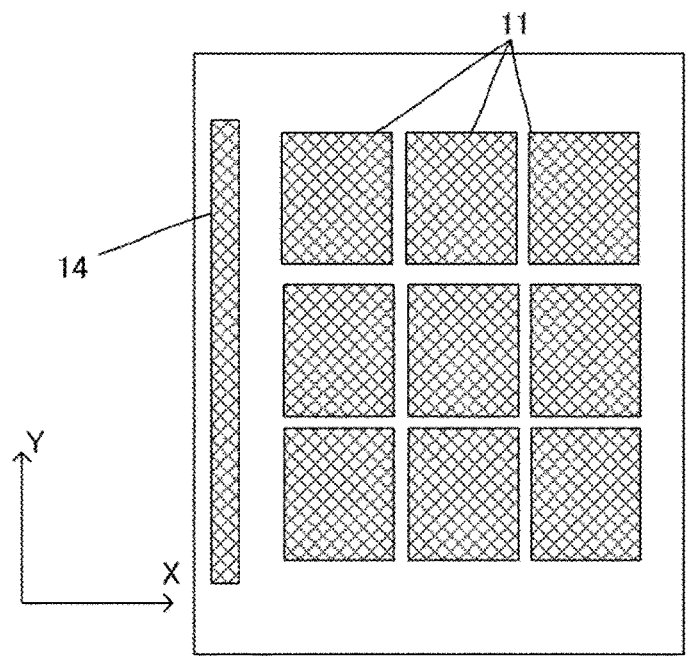
FIG. 11 is a plan view of the display panel.

Next, FIG. 10 is a cross-sectional exploded view of the display panel 40 according to a second refinement of the exemplary embodiment. FIG. 11 is a plan view showing a partial configuration of the display panel 40.

In the display panel shown in FIGS. 10 and 11, the piezoelectric film 15 is arranged not on the entire surface but on a part of the display panel 40. The other configuration is the same as the configuration shown in FIGS. 2 and 3, and the description is omitted.

Also in this case, the control unit 20 uses the pressing sensor 11P to determine which of the first front panel 40A and the second front panel 40B is pressed, and switches the driving mode of the electrostatic capacitance sensor (e.g., changes the threshold value Th). Accordingly, the touch operation on both the front and back surfaces can be detected at the same degree of sensitivity without having the touch sensors provided on both the front and back surfaces.

Moreover, according to the configuration of the second refinement of the exemplary embodiment, an area of the piezoelectric film 15 can be reduced, the manufacturing cost can be reduced, and the assembly becomes easy. The configuration is also effective for thinning.

The control unit 20 can determine which of the first front panel 40A and the second front panel 40B is pressed and then switch the driving mode of the electrostatic capacitance sensor, or may detect the screen being pressed a plurality of times for the first time and switch the driving mode thereafter. In order to obtain a natural feeling of operation, switching is preferably performed when the screen is pressed once. Further, in order to reduce false detection due to noise or vibration and to operate reliably, switching is preferably performed after the screen is pressed multiple times.

DESCRIPTION OF REFERENCE SYMBOLS

1: display device
11: electrostatic capacitance electrode
11A: first electrostatic capacitance electrode
11B: second electrostatic capacitance electrode
11D: electrostatic capacitance sensor
11P: pressing sensor
12: electrostatic capacitance sensor insulating layer
13: first pressing electrode film
14: Pressing electrode
15: piezoelectric film
16: second pressing electrode film
20: control unit
22: processing unit
23: program storage unit
30: display unit
40: display panel
40A: first front panel
40B: second front panel
45: operation detection device
47: processing device
50: case

The invention claimed is:

1. An operation detection device comprising:
a panel configured to receive a touch operation on each of a first main surface and a second main surface thereof;
a pressing operation detection unit configured to detect when a pressing operation is on the first main surface and when the pressing operation is on the second main surface of the panel;
an electrostatic capacitance sensor configured to detect when the touch operation is on the first main surface and when the touch operation is on the second main surface of the panel; and
a control unit configured to switch a driving mode of the electrostatic capacitance sensor based on whether the pressing operation is being performed on the first main surface or the second main surface as determined based on a detection result of the pressing operation detection unit that indicates which of the first main surface and the second main surface of the panel that is receiving the pressing operation,
wherein the control unit is configured to set a press detection threshold value of the electrostatic capacitance sensor and to adjust the press detection threshold value depending on whether the pressing operation detection unit determines that the first main surface or the second main surface of the panel is being operated to switch the driving mode.

2. The operation detection device according to claim 1, wherein the electrostatic capacitance sensor is a self-capacitance type sensor.

3. The operation detection device according to claim 1, wherein the electrostatic capacitance sensor is a mutual capacitance type sensor that includes a transmission electrode and a reception electrode.

4. The operation detection device according to claim 1, wherein the panel comprises:
a piezoelectric film;
a plurality of pressing electrodes disposed on opposing sides of the piezoelectric film;
first and second pressing electrode films disposed on opposing sides of the piezoelectric film to cover the plurality of pressing electrodes, respectively;
an electrostatic capacitance sensor insulating layer disposed on one of the first and second pressing electrode films; and
a plurality of electrostatic capacitance electrodes disposed on the electrostatic capacitance sensor insulating layer, wherein the electrostatic capacitance sensor includes the plurality of electrostatic capacitance electrodes.

5. The operation detection device according to claim 4, wherein the piezoelectric film is arranged on substantially an entire surface of the panel in a plan view thereof.

6. The operation detection device according to claim 4, wherein the plurality of pressing electrodes are arranged in a frame shape at an outer periphery of the piezoelectric film in a plan view thereof.

7. The operation detection device according to claim 4, wherein the plurality of electrostatic capacitance electrodes includes a plurality of first electrostatic capacitance electrodes and a plurality of second electrostatic capacitance electrodes that are arranged in a lattice shape so as to oppose to each other while interposing the electrostatic capacitance sensor insulating layer.

8. The operation detection device according to claim 7, wherein, when the pressing operation detection unit detects the pressing operation on the first main surface of the panel, the control unit is configured to use the plurality of first electrostatic capacitance electrodes as receiving electrodes and to use the plurality of second electrostatic capacitance electrodes as transmitting electrodes.

9. The operation detection device according to claim 8, wherein, when the pressing operation detection unit detects the pressing operation on the second main surface of the panel, the control unit is configured to use the plurality of second electrostatic capacitance electrodes as receiving electrodes and to use the plurality of first electrostatic capacitance electrodes as transmitting electrodes.

10. The operation detection device according to claim 9, wherein the control unit is configured to set a sensitivity uniform when the electrostatic capacitance sensor detects the touch operation on either of the first or second main surfaces of the panel.

11. The operation detection device according to claim 1, wherein the pressing operation detection unit is arranged at a part of the panel.

12. The operation detection device according to claim 1, wherein the press detection threshold value of the electrostatic capacitance sensor comprises a first press detection threshold value on a plus side of a reference potential and a second press detection threshold value on a negative side of the reference potential, and
wherein the control unit is configured to set the first press detection threshold value to have an absolute value that is larger than an absolute value of the second press detection threshold value.

13. An operation detection device, comprising:
a panel configured to receive a touch operation on each of a first main surface and a second main surface thereof;
a pressing operation detection unit configured to detect when a pressing operation is on the first main surface and when the pressing operation is on the second main surface of the panel;
an electrostatic capacitance sensor configured to detect when the touch operation is on the first main surface and when the pressing operation is on the second main surface of the panel, the electrostatic capacitance sensor being a mutual capacitance type sensor that includes a transmission electrode and a reception electrode; and a control unit configured to switch a driving mode of the electrostatic capacitance sensor based on whether the first main surface or the second main surface is receiving the pressing operation as determined based on a detection result of the pressing operation detection unit that indicates which of the first main surface and the second main surface of the panel is receiving the pressing operation, wherein the control unit is configured to perform switching between the transmission electrode and the reception electrode of the electrostatic capacitance sensor to switch the driving mode based on whether the pressing operation detection unit determines that the first main surface or the second main surface of the panel is being operated.

14. The operation detection device according to claim 13, wherein the control unit swaps the transmission electrode with the reception electrode and the reception electrode with the transmission electrode to switch the driving mode of the electrostatic capacitance sensor.

15. The operation detection device according to claim 13, wherein the control unit reconfigures the transmission electrode to be used as a reception electrode and reconfigures the reception electrode to be used as a transmission electrode to switch the driving mode of the electrostatic capacitance sensor.

16. A method for detecting a touch operation on an electronic device, the method comprising:
receiving, by a panel, a touch operation on a first main surface or a second main surface thereof;
detecting, by a pressing operation detection unit, when a pressing operation is on the first main surface and when the pressing operation is on the second main surface of the panel;
detecting, by an electrostatic capacitance sensor, when the touch operation is on the first main surface and when the touch operation is on the second main surface of the panel;
switching, by a control unit, a driving mode of the electrostatic capacitance sensor based on whether the first main surface or the second main surface is receiving the pressing operation as determined based on a detection result from the pressing operation detection unit that indicates which of the first main surface and the second main surface of the panel is receiving the pressing operation; and
setting, by the control unit, a press detection threshold value of the electrostatic capacitance sensor and adjusting the press detection threshold value depending on whether the pressing operation detection unit determines that the first main surface or the second main surface of the panel is being operated to switch the driving mode.

17. The method according to claim 16, wherein the electrostatic capacitance sensor is a self-capacitance type sensor.

18. The method according to claim 16, wherein the electrostatic capacitance sensor is a mutual capacitance type sensor that includes a transmission electrode and a reception electrode.

19. The method according to claim 18, further comprising switching, by the control unit, between the transmission electrode and the reception electrode of the electrostatic capacitance sensor to switch the driving mode.

20. A display device, comprising:
a display unit; and
an operation detection unit coupled to the display unit and including:
a panel configured to receive a touch operation from a first main surface or a second main surface;
a pressing operation detection unit configured to detect when a pressing operation is on the first main surface and when the pressing operation is on the second main surface of the panel;
an electrostatic capacitance sensor configured to detect when the touch operation is on the first main surface and when the touch operation is on the second main surface of the panel; and
a control unit configured to switch a driving mode of the electrostatic capacitance sensor based on whether the first main surface or the second main surface is receiving the pressing operation as determined based on a detection result from the pressing operation detection unit that indicates which of the first main surface and the second main surface of the panel is receiving the pressing operation,
wherein the control unit is configured to set a press detection threshold value of the electrostatic capacitance sensor and to adjust the press detection threshold value depending on whether the pressing operation detection unit determines that the first main surface or the second main surface of the panel is being operated to switch the driving mode.

21. The display device according to claim 20, wherein the panel comprises:
a piezoelectric film;
a plurality of pressing electrodes disposed on opposing sides of the piezoelectric film;
first and second pressing electrode films disposed on opposing sides of the piezoelectric film to cover the plurality of pressing electrodes, respectively;
an electrostatic capacitance sensor insulating layer disposed on one of the first and second pressing electrode films; and
a plurality of electrostatic capacitance electrodes disposed on the electrostatic capacitance sensor insulating layer, wherein the electrostatic capacitance sensor includes the plurality of electrostatic capacitance electrodes.

* * * * *